US008626669B2

(12) United States Patent
Sparks et al.

(10) Patent No.: US 8,626,669 B2
(45) Date of Patent: Jan. 7, 2014

(54) SECURE PHYSICAL BILLING SYSTEM

(75) Inventors: Kelly C. Sparks, Raleigh, NC (US);
Bennie L. Gibson, Jr., Wake Forest, NC (US)

(73) Assignee: Valentine Niobrara LLC, Los Altos, CA (US)

( * ) Notice: Subject to any disclaimer, the term of this patent is extended or adjusted under 35 U.S.C. 154(b) by 1420 days.

(21) Appl. No.: 11/832,079

(22) Filed: Aug. 1, 2007

(65) Prior Publication Data
US 2008/0033883 A1 Feb. 7, 2008

Related U.S. Application Data

(60) Provisional application No. 60/835,137, filed on Aug. 2, 2006.

(51) Int. Cl.
*G06F 21/00* (2013.01)

(52) U.S. Cl.
USPC .......... 705/55; 705/59; 705/51; 705/50; 705/901; 705/902; 705/904; 705/905; 705/909; 726/1; 726/2; 726/3; 726/4

(58) Field of Classification Search
USPC .......................................................... 705/55
See application file for complete search history.

(56) References Cited

U.S. PATENT DOCUMENTS

| | | |
|---|---|---|
| 6,655,580 B1 | 12/2003 | Ergo et al. |
| 6,889,898 B2 | 5/2005 | Katou et al. |
| 6,896,133 B2 | 5/2005 | Spagna |
| 7,024,381 B1 | 4/2006 | Hastings et al. |
| 7,035,829 B2 | 4/2006 | Morimoto |
| 7,050,989 B1 | 5/2006 | Hurt et al. |
| 7,237,720 B2 | 7/2007 | Selinfreund et al. |
| 7,237,725 B2 | 7/2007 | Stebbings et al. |
| 7,263,497 B1 | 8/2007 | Wiser et al. |
| 7,355,936 B2 | 4/2008 | Senshu |
| 7,363,361 B2 | 4/2008 | Tewari et al. |
| 2002/0016726 A1* | 2/2002 | Ross .................... 705/7 |
| 2002/0029248 A1 | 3/2002 | Cook et al. |

(Continued)

FOREIGN PATENT DOCUMENTS

JP 2000098885 A * 4/2000 ............... G09C 1/00

OTHER PUBLICATIONS

Rosenblatt, "The New Technologies for Pay TV Content Security." Dec. 5, 2011.*

(Continued)

*Primary Examiner* — James A Reagan

(57) ABSTRACT

A system for physical distribution of secure content to customers and physical collection of secure billing information. A plurality of content storage devices may be provided to a customer, each content storage device including secure content. A billing storage device may also be provided to the customer, the billing storage device including decryption information, which may be used by a media player for decrypting the secure content of the content storage devices to exhibit the secure content to the customer. The content and billing storage devices may be provided to the customer via physical delivery and without electronic data transmission occurring to or from the physical location of the customer. After each billing period, the billing storage device may be received from the customer via physical delivery. The billing storage device includes secure billing information stored in a writeable area, which is associated with the exhibition of secure content to the customer.

51 Claims, 17 Drawing Sheets

(56) References Cited

U.S. PATENT DOCUMENTS

| | | | |
|---|---|---|---|
| 2004/0117306 A1 | 6/2004 | Karaoguz et al. | |
| 2005/0137948 A1* | 6/2005 | Kissner et al. | 705/34 |
| 2006/0020550 A1* | 1/2006 | Fields et al. | 705/51 |
| 2006/0265327 A1* | 11/2006 | Rao et al. | 705/40 |

OTHER PUBLICATIONS

PCT Notification of Transmittal of the International Search Report and the Written Opinion of the International Searching Authority, or the Declaration, dated Aug. 7, 2008, 7 pages.

* cited by examiner

SECURE PHYSICAL BILLING SYSTEM

PRIORITY CLAIM

This application claims benefit of priority to U.S. Provisional Patent Application No. 60/835,137 entitled "Secure Physical Billing System" filed on Aug. 2, 2006, whose inventors were Kelly C. Sparks and Bennie Gibson, and which is hereby incorporated by reference as though fully and completely set forth herein.

BACKGROUND OF THE INVENTION

1. Field of the Invention

This invention relates to billing systems and, more particularly, to a secure physical billing system.

2. Description of the Related Art

Current movie distribution offerings fall into two primary categories: PayTV and Home Video. PayTV solutions encompass all solutions where electronic data is transmitted to or from a customer's home. This includes, for example, satellite and cable pay-per-view, Internet-based video downloads and streams, cable video-on-demand (VOD) systems, and other electronic delivery methods that require any form of data transmission to or from inside the customer's home to exhibit or purchase the exhibition of the content. Home Video solutions encompass all physical delivery methods including rental houses, retail, and any other physical delivery method. In this industry, there are requirements that govern how content is released and when content is released, and these requirements dictate which form of delivery can be used with the PayTV solutions and the Home Video solutions.

Technology has afforded some innovative ways to distribute content to consumers. However, by their very nature, many of these distribution methods fall into the PayTV solutions category by virtue of the fact that they all require some form of electronic data transmission to or from the customer's home to exhibit and/or pay for those exhibitions. As a result, these solutions are subject to the rules and restrictions set up by the movie studios, e.g., those that delay the availability of new releases for PayTV.

On the other hand, Home Video solutions, such as rental houses and retail, are not subject to many of these rules and restrictions. Home Video solutions typically offer new releases soon after the material is made available. However, Home Video solutions lack the on-demand convenience of the PayTV solutions.

Some current technologies enable physical content to be delivered securely to the home, for example, via locked CDs or DVDs. However, these solutions typically still require electronic transmission to unlock or pay for content, which results in these technologies being classified as a PayTV services as well, even if the content is physically delivered to the customer's home.

SUMMARY

Various embodiments are disclosed of a method and apparatus for implementing a secure physical billing system. In one embodiment, a service provider may send a plurality of content storage devices to a customer via physical delivery. Each content storage device includes secure content. In addition, the service provider may send a billing storage device to the customer via physical delivery. The billing storage device includes decryption information, which may be used by a media player for decrypting the secure content of the content storage devices to exhibit the secure content to the customer. The content storage devices and the billing storage device may be provided to the customer via a physical delivery method, such as mail or courier, and without any electronic data transmission occurring to or from the physical location of the customer. The billing storage device may be provided to the customer once every billing period according to a predetermined billing cycle, e.g., a monthly billing cycle.

In one embodiment, in response to the customer receiving and loading a selected one of the content storage devices and the billing storage device into the media player, the media player may decrypt the secure content of the selected content storage device using the decryption information of the billing storage device, exhibit the secure content to the customer, and write secure billing information associated with the exhibition of the secure content to a writeable area of the billing storage device. The media player may exhibit the secure content to the customer without any electronic data transmission occurring to or from the physical location of the customer. At the end of the billing period, the customer may return the billing storage device to the service provider via physical delivery. The billing storage device may include the secure billing information stored in a writeable area of the billing storage device. The service provider may process the secure billing information and obtain payment from the customer for the activity during that billing period.

In one embodiment, the service provider may also send an index storage device to the customer via physical delivery. The index storage device may include decryption information, which along with the decryption information of the billing storage device, may be used by the media player for decrypting the secure content of the content storage devices to exhibit the secure content to the customer.

Figure 1:
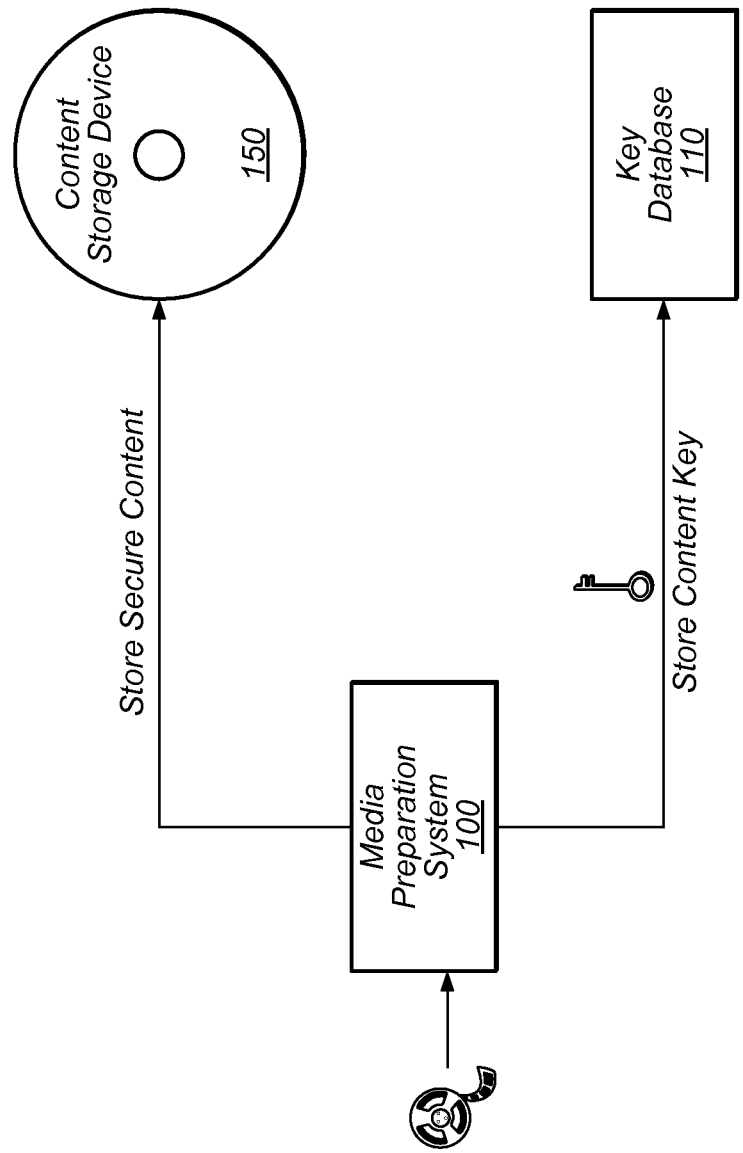
FIG. 1 is a diagram of a content preparation process, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turing now to FIG. 1, a diagram is shown of the content preparation process, according to one embodiment. During the content preparation process, a media preparation system 100 encrypts, compresses, and stores secure content in content storage devices 150. Each content storage device 150 is a secure physical medium for distributing the encrypted content. As the content is encrypted, compressed and stored, the keys to unlock the secure content are stored in a key database 110 for later use, as will be described further below. The owners of the content and the corresponding manufacturers may use the media preparation system 100 to exclusively create the content storage devices 150, and then send the content storage devices 150 to a service provider for distribution to customers. In some cases, the service provider may obtain authorization from the content owners to also create content storage devices 150 using an in-house media preparation system 100.

In one embodiment, the content storage device 150 is a digital video disc (DVD). In is noted, however, that in other embodiments the content storage device 150 may be other secure physical media, such as HD DVD, Blu-ray Disc, CD, Flash Memory Card, Hard Drive, USB Flash Drive, etc. The content that is stored in the content storage device 150 may be movies, documentaries, or television shows. The content may also be other audio-visual works, such as music videos, presentations, and picture slideshows, visual works such as pictures or background images with text, and audio works, such as music and other recorded audio.

Figure 2:
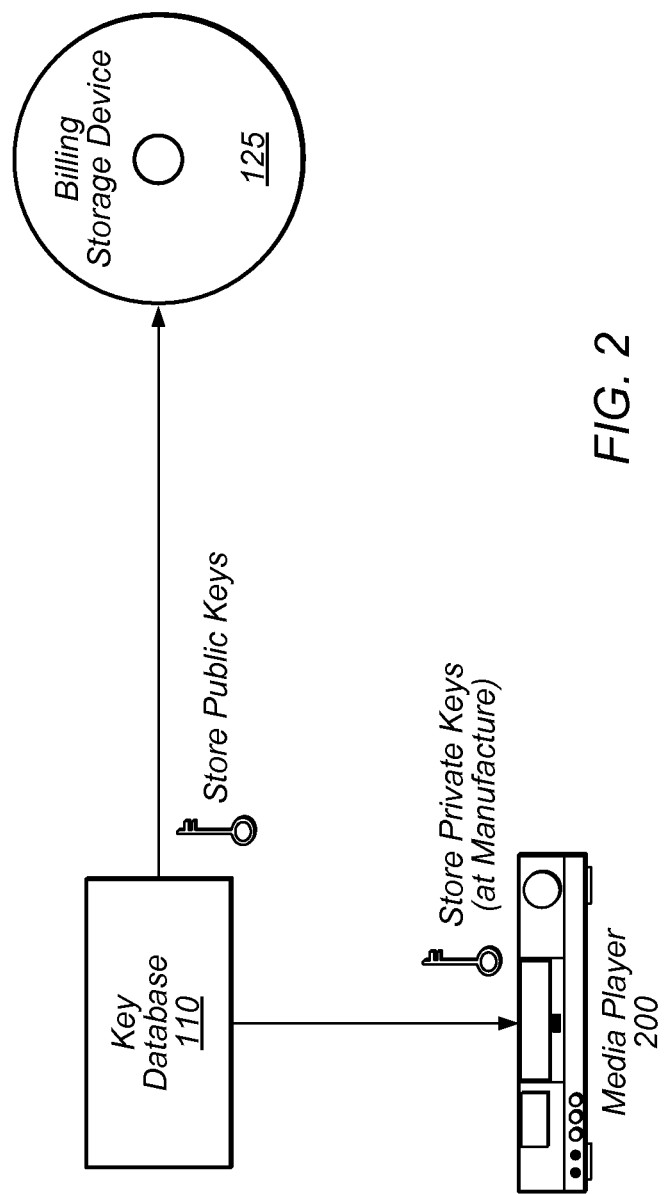
FIG. 2 is a diagram of a public/private key assignment process, according to one embodiment.

FIG. 2 is a diagram of a public/private key assignment process, according to one embodiment. At manufacture, private keys are generated and stored in a secure memory of a media playback device or media player 200. In one specific implementation, during the public/private key assignment process, the corresponding public keys that are tethered to a unique media player 200 are encrypted and stored in a billing storage device 125. As will be described further below, when the billing storage device 125 is loaded into the media player 200, the private keys are used by the media player 200 for decrypting the corresponding public keys of the billing storage device 125, which are then used to decrypt and exhibit secure content to a customer. In this implementation, since the information on the billing storage device 125 is tethered to a unique media player 200, only a single media player (i.e., media player 200) may be configured to read the billing storage device 125, based on the public/private key encryption technique. This may result in a secure physical billing media that cannot be read by any other media player but the one for which the billing media was created, since the private keys stored in the media player are required to unlock the public keys on the billing media. In one embodiment, the billing storage device 125 may be a storage device that is part pre-recorded (e.g., CD-ROM) and part recordable (e.g., CD-R) on the same disc, which enables both read-only data and unique recordable data on the same disc. It is noted, however, that in other embodiments the billing storage device 125 may be other secure physical media or computer readable storage media, such as CD-RW, DVD-R, DVD-RW, Flash Memory Cards, Hard Drive, USB Flash Drive, etc.

In other implementations, the public keys on the billing storage device 125 may be tethered to two or more media players 200. In this implementation, the decision on how many media players 200 will be configured to read a specific billing storage device 125 associated with a specific customer account may be determined based on the customer's needs or other requirements. In one specific example, the customer may have multiple media players 200 at home or at a business, which some or all need to be configured to read the billing storage device 125. In another example, the customer has a family member living away from home (e.g., a son or daughter away at college), who will be provided a media payer 200 under the same account that can read the billing storage device 125.

Figure 3:
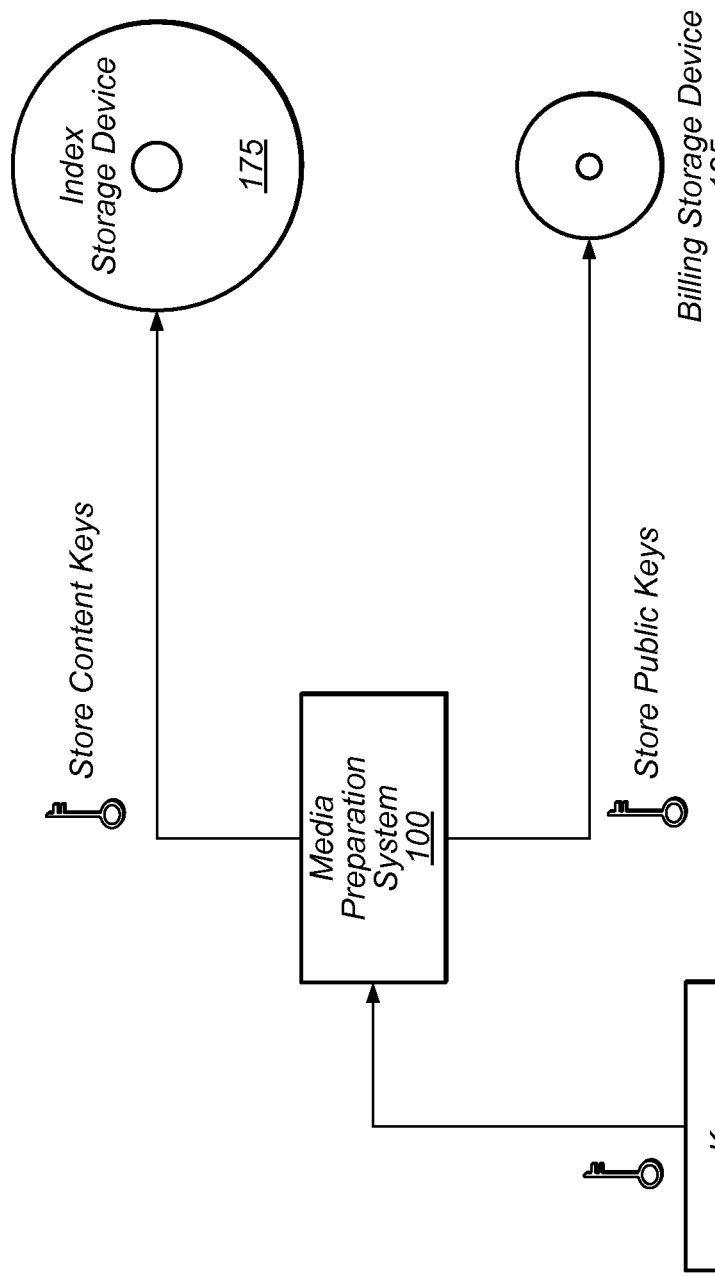
FIG. 3 is a diagram of a content key assignment process, according to one embodiment.

FIG. 3 is a diagram of a content key assignment process, according to one embodiment. In one specific implementation, during the content key assignment process, the content keys associated with the secure content of content storage devices 150, which were stored in key database 110, are encrypted by the media preparation system 100 using the corresponding public keys (which, as described above, are stored in the associated billing storage device 125). In one embodiment, the secure content of each content storage device 150 is associated with one content key that will decrypt the secure content of the content storage device 150. In other words, in the case of movies for example, a movie title stored in a particular content storage device 150 is associated with one content key that will decrypt that specific movie title of the storage device 150 for exhibition to the customer.

As illustrated in FIG. 3, in one specific implementation, the content keys associated with the secure content of particular content storage device 150 may be encrypted and stored in an index storage device 175. It is noted, however, that in other embodiments, the content keys may be stored in the corresponding billing content device 125 along with the public keys. As will be described below, additional information may be stored in the billing storage device 125 and/or in the index storage device 175. In one embodiment, the index storage device 175 may be a CD. It is noted, however, that in other embodiments the index storage device 175 may be other secure physical media or computer readable storage media, such as CD-R, CD-RW, DVD-R, DVD-RW, Flash Memory Cards, Hard Drive, USB Flash Drive, etc.

Figure 4A:
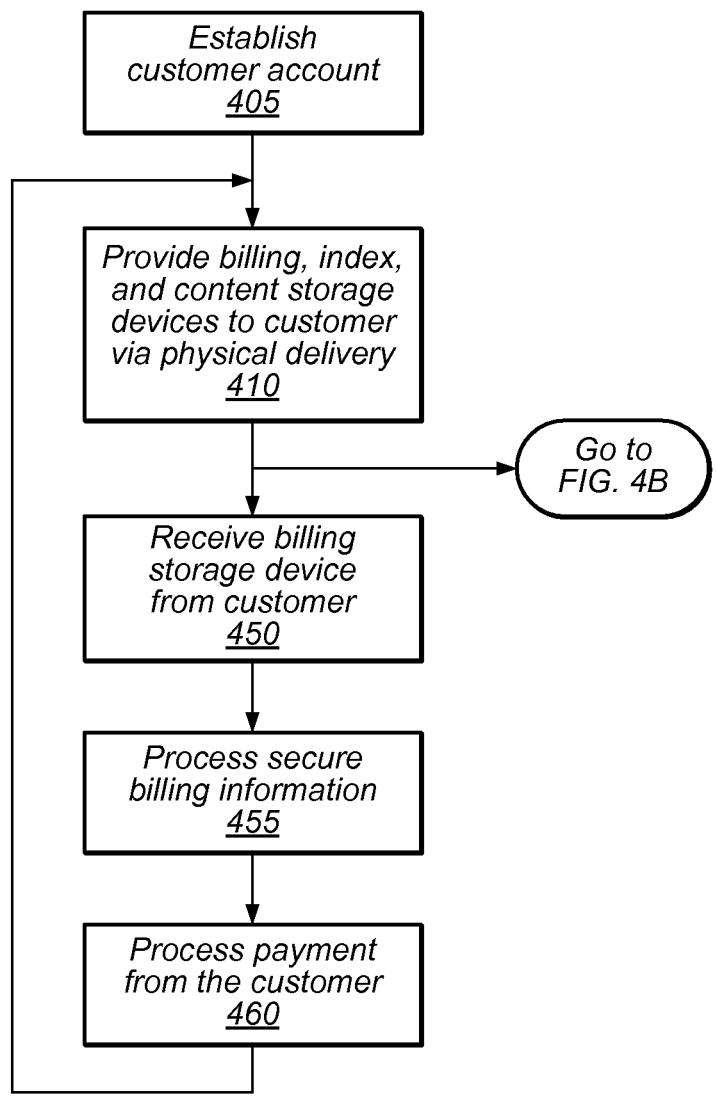
FIGS. 4A-4B are flow diagrams illustrating a method for physical distribution of secure content to customers and physical collection of secure billing information, according to one embodiment.

FIG. 4A is a flow diagram illustrating a method for physical distribution of secure content to customers and physical collection of secure billing information (from the service provider side), according to one embodiment. The physical distribution of secure content and the physical collection of secure billing information are performed via physical deliver and without any electronic data transmission occurring to or from the physical location of the customer. It should be noted that in various embodiments, some of the steps shown may be performed concurrently, in a different order than shown, or omitted. Additional steps may also be performed as desired.

Referring collectively to FIGS. 1-4A, the service provider establishes an account for a particular customer (block 405). The service provider may establish an account for the customer in response to receiving information from the customer, such as name, address, payment information, content preference information, etc. The payment information may be information associated with any payment method, such as credit card account or checking account information. The content preference information may be any customer content preferences, such as genre, era, actor, artist, and director preferences, and/or specific content titles.

After establishing the account, the service provider creates a billing storage device 125 and an index storage device 175, as described above with reference to FIGS. 2-3. The service provider provides one or more content storage devices 150, the billing storage device 125, and the index storage device 175 to the customer via physical delivery (block 410). As described above, each of the content storage devices 150 includes secure content, and the billing storage device 125 and index storage device 175 include decryption information which is used by a media player 200 of the customer for decrypting the secure content of the content storage devices 150 to exhibit the secure content to the customer. In some implementations, all the encryption/decryption information is stored in the billing storage device 125, and therefore there is no need to create or distribution index storage device(s) 175.

The storage devices are provided to the customer via physical delivery and without any electronic data transmission occurring to or from the physical location of the customer (e.g., home or business). The physical delivery method employed may be any method for physically delivering goods, such as delivery by mail and delivery by courier. The service provider may physically deliver the storage devices from a centralized service center. To provide faster delivery, the service provider may deliver the storage devices from local or regional service centers, which are strategically located across the geographic service area. The service provider may also offer a customer pick-up/drop-off option at local service centers or local retail stores.

The service provider may provide a billing storage device 125 and an index storage device 175 once every billing period according to a predetermined billing cycle. In one embodiment, the predetermined billing cycle is a monthly billing cycle. It is noted, however, that the predetermined billing cycle may be various time periods, such as a bi-monthly billing cycle or a quarterly billing cycle.

Figure 4B:
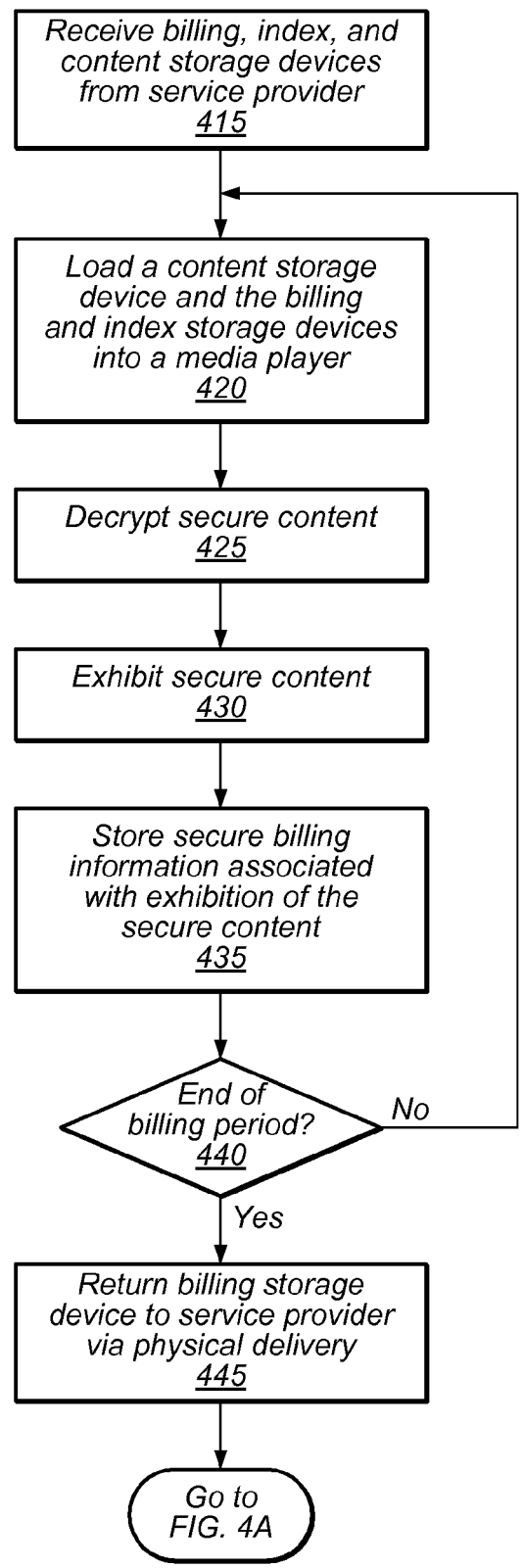

As noted in FIG. 4B, the customer receives the one or more content storage devices 150, the billing storage device 125, and the index storage device 175 via physical deliver (block 415). FIG. 4B is a flow diagram illustrating a method for physical distribution of secure content to customers and physical collection of secure billing information (from the customer side), according to one embodiment. It should be noted that in various embodiments, some of the steps shown may be performed concurrently, in a different order than shown, or omitted. Additional steps may also be performed as desired. As noted above, in some implementations, the customer may only receive one or more content storage devices 150 and a billing storage device 125 each billing period.

The customer may load a content storage device 150, the billing storage device 125, and the index storage device 175 into media player 200 (block 420). The customer may, at any point in time during the current billing period, select one of the received content storage devices 150 and load the selected content storage device 150 into the media player 200. Media player 200 uses the decryption information of the billing storage device 125 and of the index storage device 175 to decrypt the secure content of the selected content storage device 150 (block 425). One implementation of the decryption process will be further described below with reference to FIGS. 6-13. After decrypting the secure content, media player 200 exhibits the secure content to the customer (block 430). Specifically, the secure content is exhibited to the customer without any electronic data transmission occurring to or from the physical location of the customer.

Media player 200 may subsequently store secure billing information associated with the exhibition of the secure content (block 435). The secure billing information may include data indicating the number of times the secure content of each content storage device 150 was exhibited to the customer. In other words, this data may indicate the number of times content was rented. In the case of movies for example, the data may indicate how many times each movie title was exhibited to the user. The secure billing information may also include data indicating whether the customer purchased any of the secure content associated with the content storage devices 150. If the customer purchases content (e.g., a movie title), the customer pays a one time fee for unlimited viewing of the content. The secure billing information may also include data indicating whether the customer selected any of the secure content for a rent-to-own program, or is currently participating in a rent-to-own program. In a rent-to-own program, the customer may obtain ownership of content and unlimited viewing privileges after renting the content a predetermined number of times.

The process of loading a content storage device 150, decrypting the secure content, exhibiting the secure content, and storing the associated billing information may be repeated various times during the current billing period. However, when the end of the current billing period arrives (block 440), the customer returns the billing storage device 125 to the service provider via physical delivery and without any electronic data transmission occurring to or from the physical location of the customer (block 445). For example, the customer may return the billing storage device 125 to a local service center or retail store, a regional service center, or a centralized service center. In some implementations, the customer may have the option of returning the billing storage device 125 before the end of the current billing period, for example, if the customer wants to receive additional content storage devices 150 during the current billing period.

Even though the customer returns the billing storage device 125, the customer may keep all the received content storage devices 150 to begin to build a library of secure content. The library of secure content may always be available for the customer whether they want to rent, buy, or participate in a rent-to-own program. The customer may keep or discard the index storage device 175, since the customer will not only receive an updated billing storage device 125 in the next billing period, but also an updated index storage device 175.

Returning to FIG. 4A, the service provider receives the billing storage device 125 from the customer (block 450). The service provider then processes the secure billing information contained in the billing storage device 125 (block 455). The service provider may have processing capabilities in all of their local service centers and retail stores, and the regional service centers. In some cases, the service provider may have their processing facilities only in the regional service centers, or just in a centralized service center.

After processing the billing information, the service provider processes payment from the customer for the detected activity within the billing period (block 460). For instance, as described above, the customer may be billed for rentals, purchases, and for participating in a rent-to-own program.

In some embodiments, for movie rentals, media player 200 may include a mechanism for detecting whether the customer watched all or just part of the movie associated with a content storage device 150. Media player 200 may indicate in the billing information written to the billing storage device 125 whether the customer watched all or just part of the movie. In one embodiment, the service provider may bill the customer on a pro-rated basis depending on the percentage of the movie the customer watched. In other embodiments, the service provider may bill the customer the full rental fee even if the customer just watched part of the movie. In one embodiment, the customer is charged a rental fee each time the movie is exhibited to the customer. In other embodiments, each time a customer rents a movie, the customer may watch the movie as many times as desired within a predetermined amount of time, e.g., 12 hours or 24 hours, without being charged another rental fee. It is noted that these billing options may also be applied to other types of content besides movies.

For purchases, media player 200 may store identification information which identifies certain content as purchased content, so the activity with respect to that particular content (outside of the initial purchase transaction) will not be noted in the billing information that is written to the billing storage device 125. In other embodiments, the activity with respect to purchased content is noted in the billing storage device 125, however, the processing center maintains records of purchase activity for each customer and does not bill the customer for activity if the customer previously purchased the content. For a rent-to-own program, the customer may obtain ownership of particular content after renting the content a predetermined number of times, e.g., when the total rental fees for the content total approximately one and a half times or two times the typical cost of the content. It is noted, however, that in other embodiments the rental, purchase, and rent-to-own program, and the billing associated with the programs, may be modified as desired. For instance, in some embodiments, the customer may be automatically enrolled in a rent-to-own program each time the customer rents some content.

After billing the customer, the process may repeat. That is, the service provider may send one or more additional content storage devices 150, an updated billing storage device 125, and an updated index storage device 175 to the customer via physical deliver (block 405). The content storage devices 150 may be selected based on user preferences associated with the account. It is noted, however, that certain content may be sent to the customer for other reasons, e.g., for advertisement and promotion purposes, for market testing, and based on general popularity of newly released content. The updated billing storage device 125 and the updated index storage device 175 include encryption/decryption information (and other supporting information) for the content that is provided to the customer in the current billing period, as well as for the content that was previously provided to the customer in previous billing periods. As described above, in some embodiments, only the billing storage device 125 is used by the service provider (and not the index storage device 175), and therefore only an updated billing storage device 125 is provided to the customer each billing period.

In various embodiments, since the information on the billing storage device 125 is tethered to a specific player of a specific customer (or in some cases, multiple players of the same customer), the billing storage device 125 may include additional information that is personalized for each customer. For instance, the billing storage device 125 may include personalized advertisements, which could be exhibited to the user via media player 200. The advertisements included in a particular billing storage device 125 may be selected based on the customer's past behavior, billing history, selected user preferences, etc. Loyalty rewards or incentives could also be written into the billing storage device 125 based on this information.

Furthermore, to deal with specific release dates for films (or other content), the billing storage device 125 may also contain time zone settings so that media player 200 will know when to unlock or release films that might only be available for viewing starting at a certain future date. For example, a film may be included in a content storage device 150 and sent to the customer before the official release date. However, the time zone and unlock information on the accompanying billing storage device 125 will prevent the customer from viewing the content until a specified future date, i.e., the official release date. The stored time zone settings (based on the customer's billing address) will allow the key for the film, which is used to unlock the content, to be released at exactly midnight the release date. With this method, a film can be released exactly on the release date, regardless of a customer's time zone. It is noted that this personalized information, i.e., personalized advertisements, loyalty rewards/incentives, and time zone settings and unlock information for content release dates, may also be included within the index storage device 175.

Figure 5:
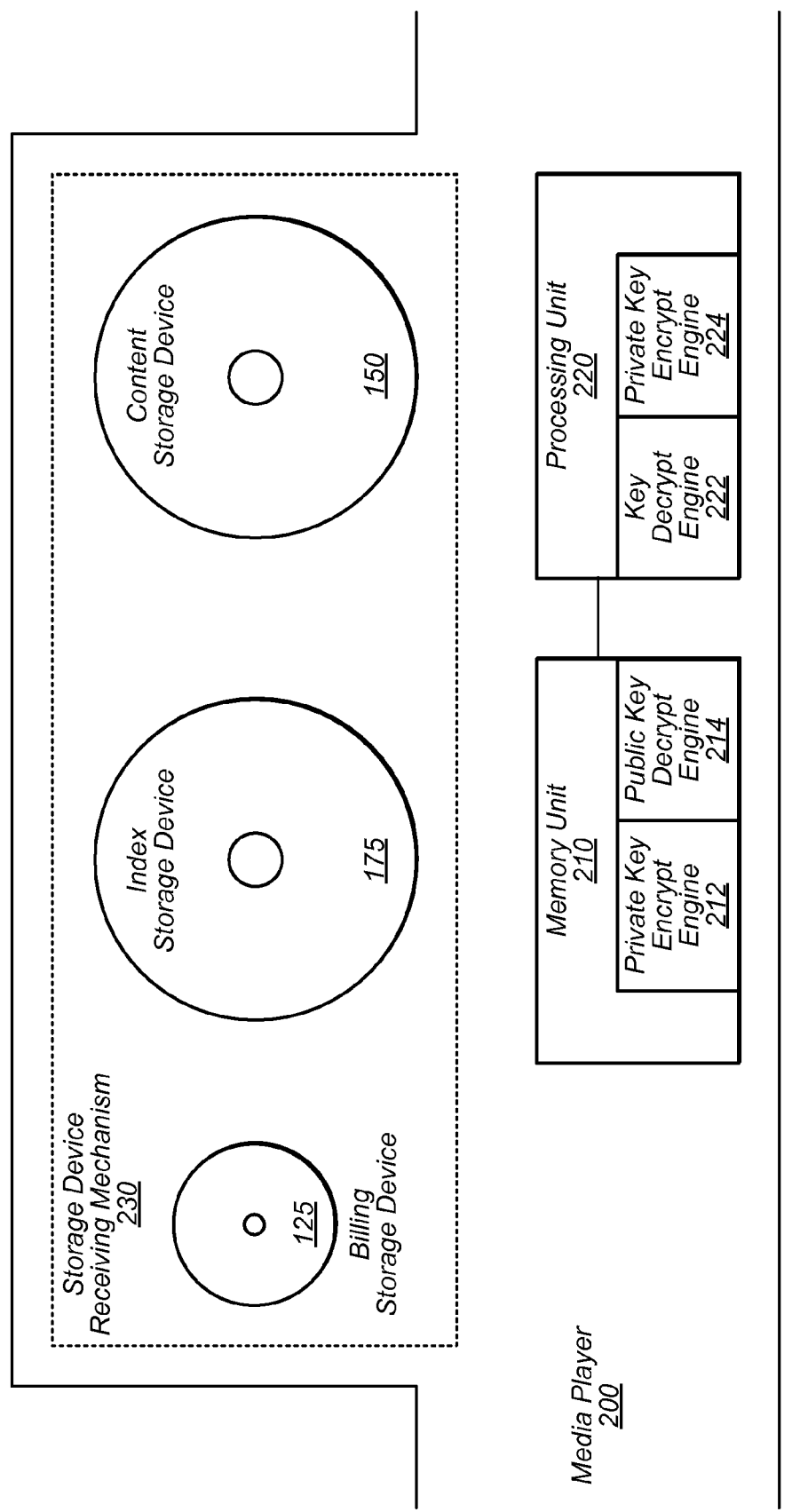
FIG. 5 is a block diagram of one embodiment of a media player.

FIG. 5 is a block diagram of one embodiment of media player 200. Media player 200 includes a memory unit 210, a processing unit 220, and a storage device receiving mechanism 230. Media player 200 may also include various other components and features (not shown) that are typical of media players, such as one or more power converters, an LED display, rewind/fast forward/stop/play/power/eject buttons, stereo system and television connectors, etc. Media player 200 may be a stand-alone system, or may be one of a plurality of devices of a system, such as a personal computer system or an automobile computer system, among others. Media player 200 is connectable to a display device for exhibiting secure content to the customer. For example, media player 200 may be connected to a television, or to computer monitor.

As illustrated, memory unit 210 includes private key encryption engine 212 and public key decryption engine 214, and processing unit 220 includes key decryption engine 222 and private key encryption engine 224, for encrypting/decrypting information associated with the exhibition of secure content, as will be further described below with reference to FIGS. 6-13. In one embodiment, memory unit 210 may be secure flash memory, although other embodiments are contemplated which may include other types of memory, e.g., SDRAM or hard disk drive. Processing unit 220 may be a video digital signal processor (DSP) unit. It is noted, however, that in other embodiments processing unit 220 may be other types of processing devices, e.g., a processor in the x86 family of processors.

Storage device receiving mechanism 230 is a mechanism that is configured to receive one or more content storage devices 150, the billing storage device 125, and the index storage device 175. Receiving mechanism 230 may include a single receiving slot or tray, which opens to accept all the storage devices. In other embodiments, receiving mechanism 230 includes three separate receiving slots or trays, which can be separately opened by the customer. For example, a first receiving slot may receive one or more content storage devices 150, a second receiving slot may receive the billing storage device 125, and a third receiving slot may receive the index storage device 175. When the customer loads the pertinent storage devices, the receiving mechanism 230 may accept the storage devices and load the storage devices inside media player 200 for further processing.

In various embodiments, memory unit 210 of media player 200 may include program instructions, which are executable by processing unit 220 to obtain the encryption/decryption information from the received billing storage device 125, decrypt the secure content of a received content storage device 150 using the decryption information, exhibit the secure content to the customer, and write secure billing information to a writeable area of the received billing storage device 125. The secure billing information written into the received billing storage device 125 is information with the exhibition of the secure content to the customer.

It should be noted that the components described with reference to FIG. 5 are meant to be exemplary only, and are not intended to limit the invention to any specific set of components or configurations. For example, in various embodiments, one or more of the components described may be omitted, combined, modified, or additional components included, as desired. For instance, in some embodiments, media player 200 may include multiple memory units and/or processing units.

Figure 6:
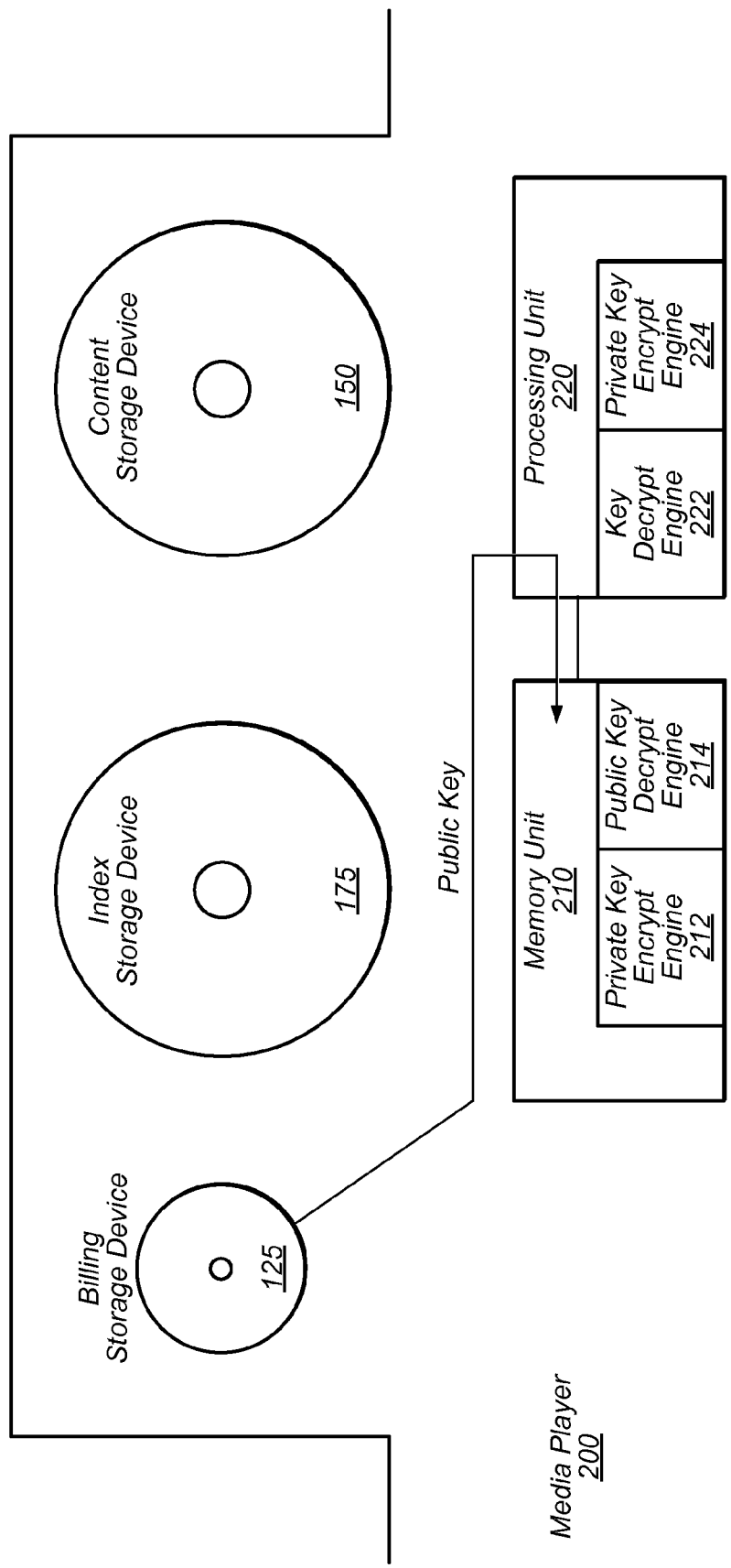
FIGS. 6-13 are diagrams illustrating a method by which the media player decrypts the secure content of a selected content storage device to exhibit the content to a customer, according to one embodiment.
Figure 7:
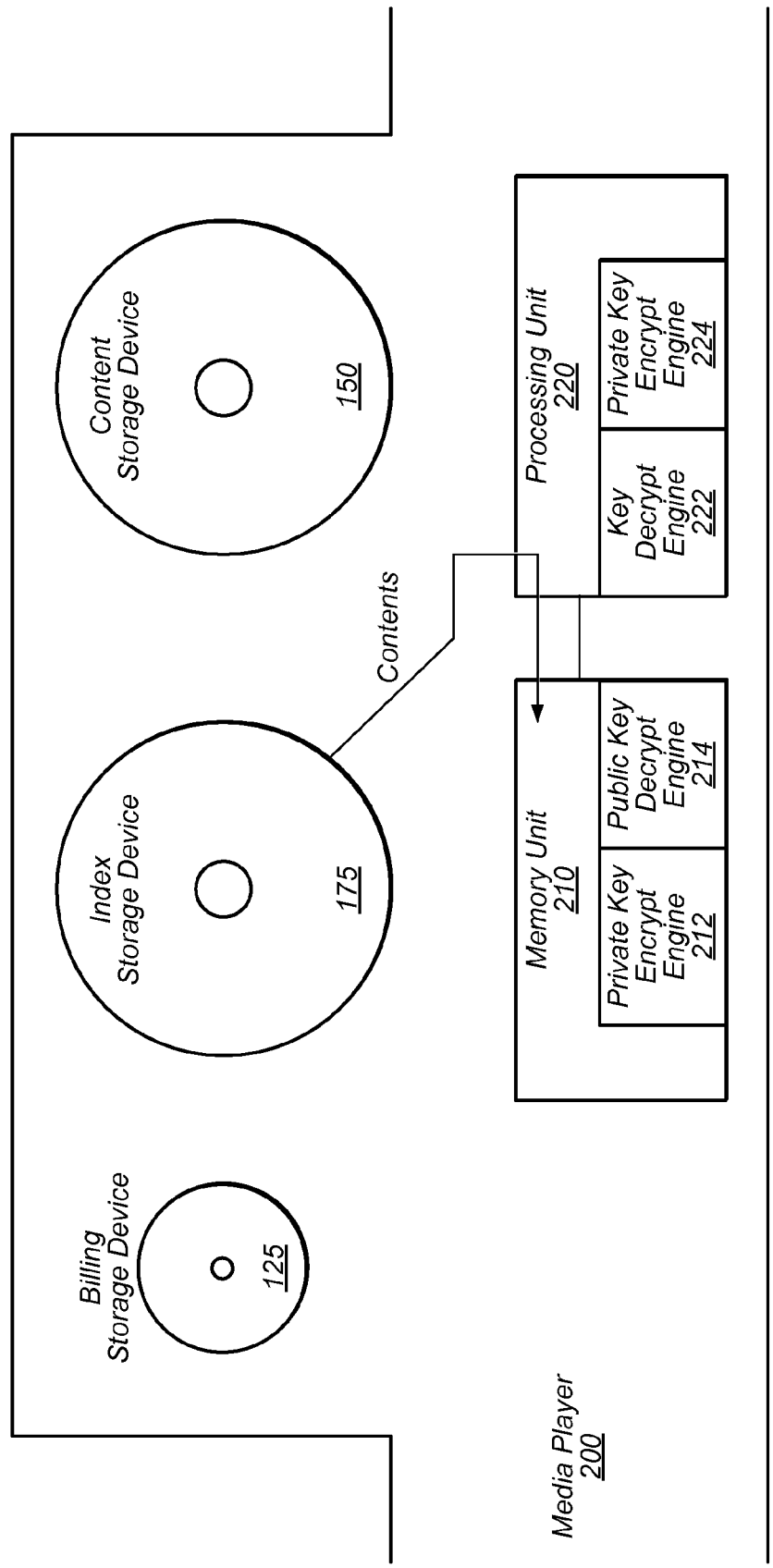

FIGS. 6-13 illustrate a process by which media player 200 decrypts the secure content of content storage device 150 to exhibit the content to the customer, according to one embodiment. As depicted in FIG. 6, when the storage devices are loaded into media player 200, media player 200 may read a tethered public key from the billing storage device 125 and decrypt it to enable the contents of the billing storage device 125 to be accessed. In one embodiment, the billing storage device 125 may be tethered to a single media player 200 (or a predetermined number of media players 200) utilizing public/private encryption methodologies. It is noted, however, that in other embodiments other encryption methodologies may be implemented.

Once the contents of the billing storage device 125 are accessible to the media player 200, the media player 200 may read the public key necessary to access the contents of the index storage device 175 (see FIG. 6). Media player 200 may then use the public key obtained from the billing storage device 125 to access the contents of the index storage device 175 (see FIG. 7). For example, based on instruction from the customer, media player 200 may access content information, such as pricing, content descriptions, content trailers, and other associated information.

Figure 8:
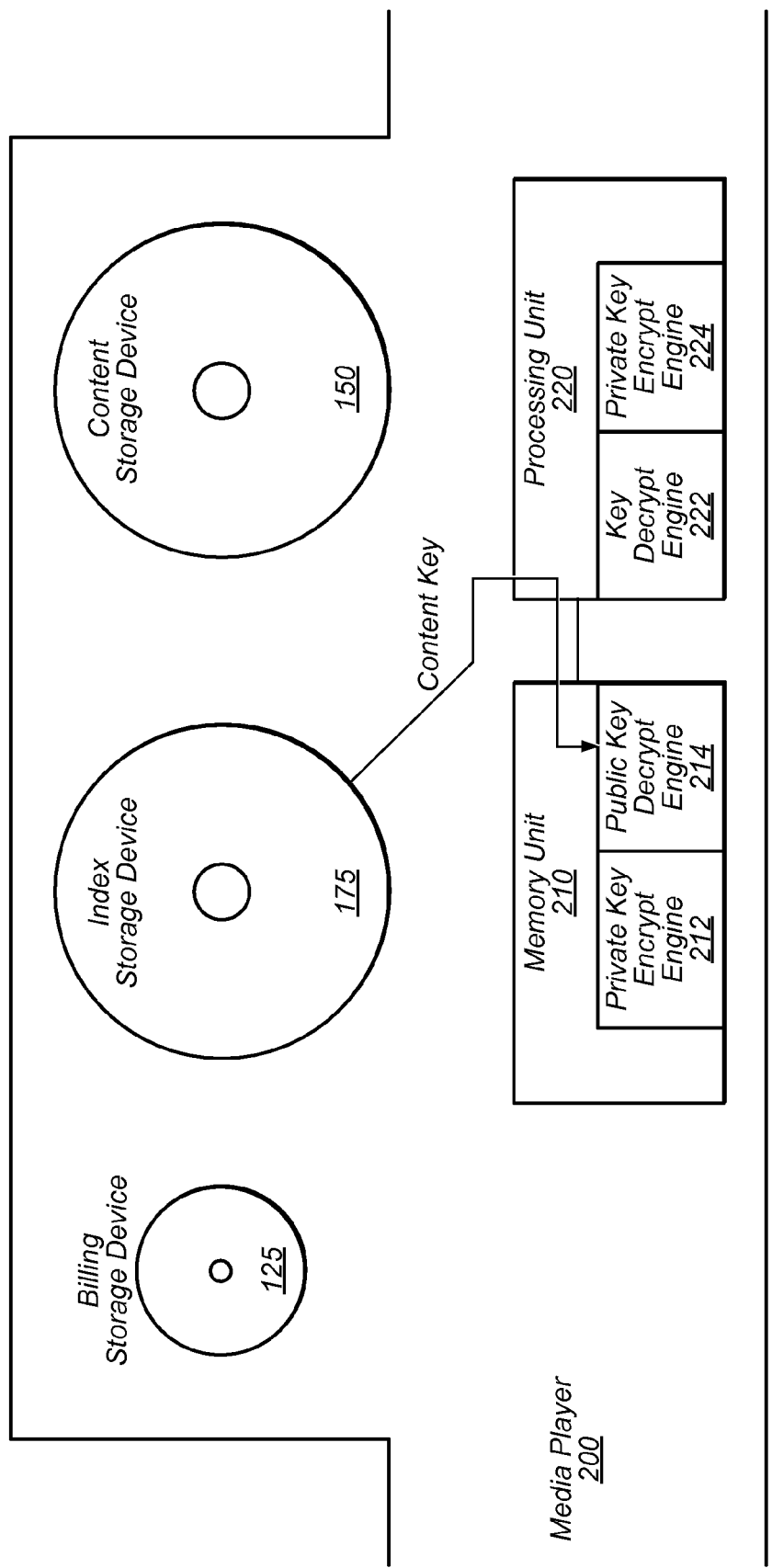

When the customer selects and loads a content storage device 150 into media player 200 for playback, media player 200 utilizes a public key obtained from the billing storage device 125 to access a content key associated with the selected content from the index storage device 175 (see FIG. 8).

Alternately, as described above, in other embodiments, the billing storage device 125 may contain the content keys associated with the content storage devices 150 (since in some implantations the index storage device 175 may not be used). In these embodiments, each content key may be tethered to media player 200 utilizing a public key that is unique to media player 200 (i.e., matching public/private keys). In one specific implementation, since the billing storage device 125 may contain a recordable surface, unique content keys that are encrypted with a public key that is tied to a media player 200 may be written in the recordable area of the billing storage device 125. With many different unique private keys available on each media player 200, the billing storage device 125 may be encrypted uniquely for each media player 200 every billing period with a different public/private key scheme. In one embodiment, the entire set of keys for the library of content associated with the customer may be tethered each billing period.

In some cases, the index storage device 175 may be a ROM-based media. In one specific implementation, it may not be commercially feasible to make the index storage devices 175 unique down to the player level. Therefore, in this specific implementation, all keys on the index storage devices 175 may be encrypted using a public key that is known to all or some significant number of media players 200. The security risks or concerns associated with this technique may be mitigated by encrypting the non-unique public key for the index storage devices 175 with a unique public key on the billing storage device 125 tethered to the pertinent media player 200.

FIGS. 9-12 illustrates a process for using the public/private keys to securely transfer secure data, e.g., a content key, from one internal player component, such as memory unit 210, to another, such as processing unit 220. The content key that is securely transferred may be the content key that was obtained from the index storage device 175 (or from the billing storage device 125), as was described above. This process may be necessary in some implementations where the processing unit 220 requires access to the content keys.

Figure 9:
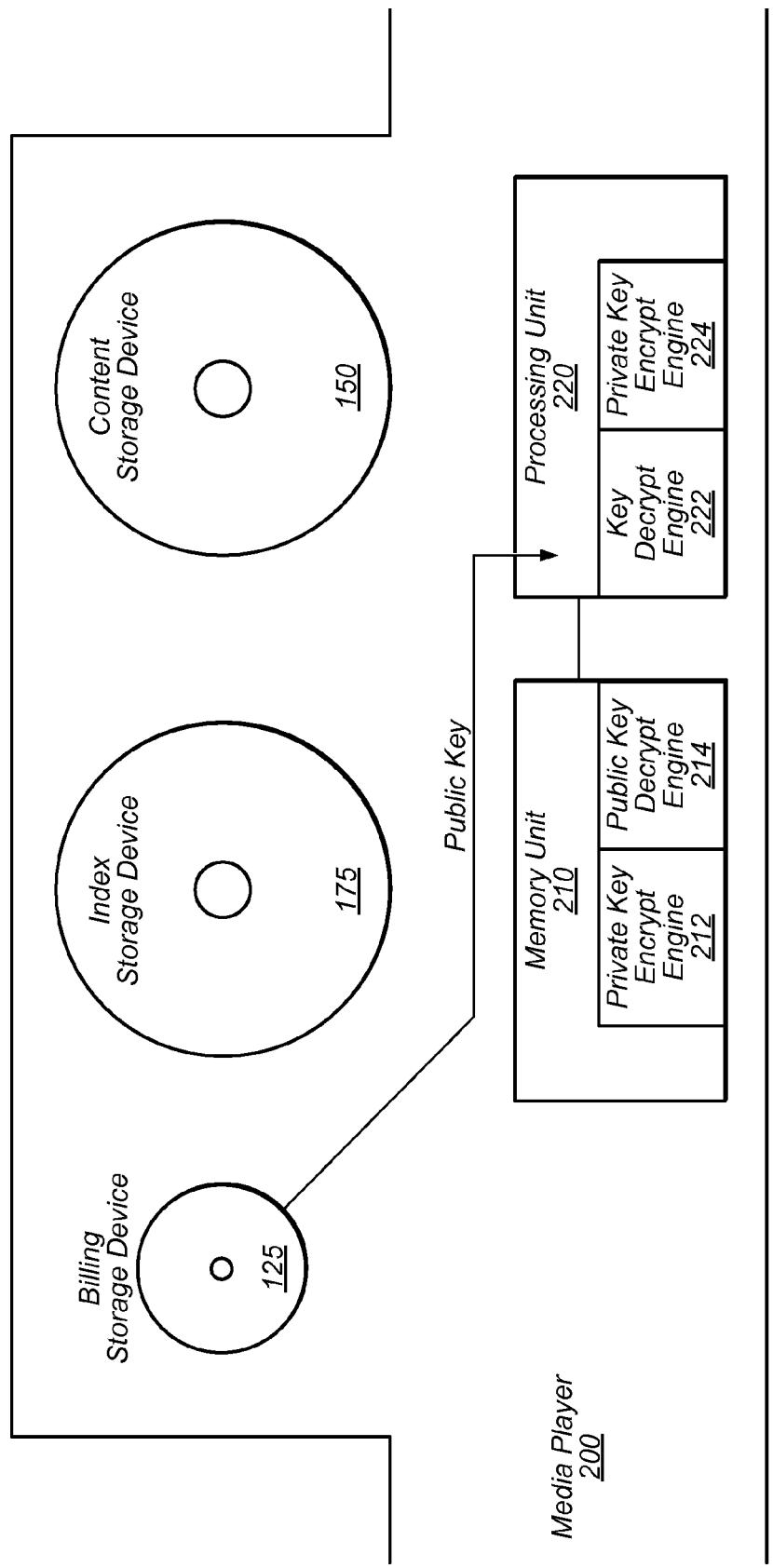
Figure 10:
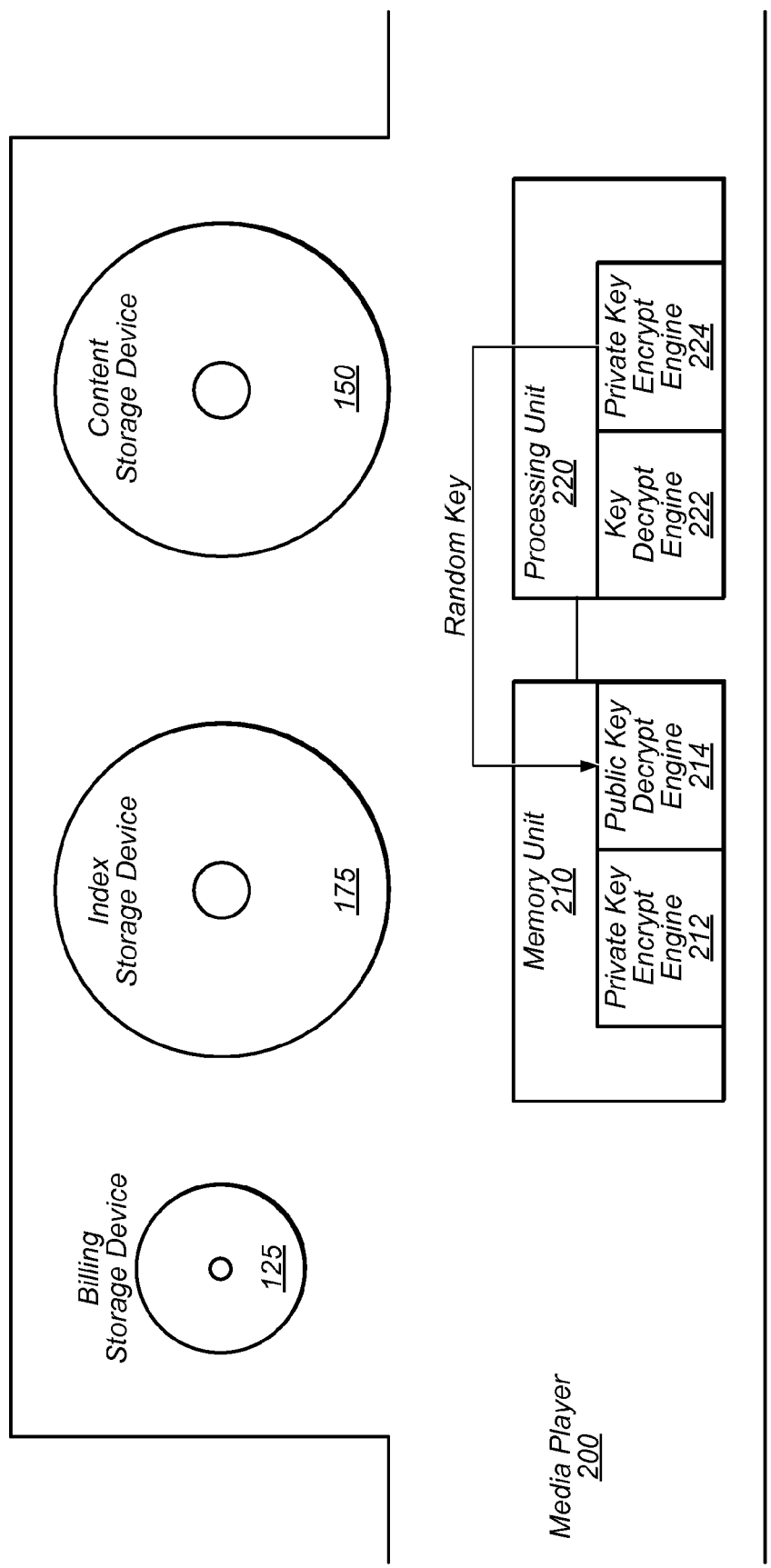
Figure 11:
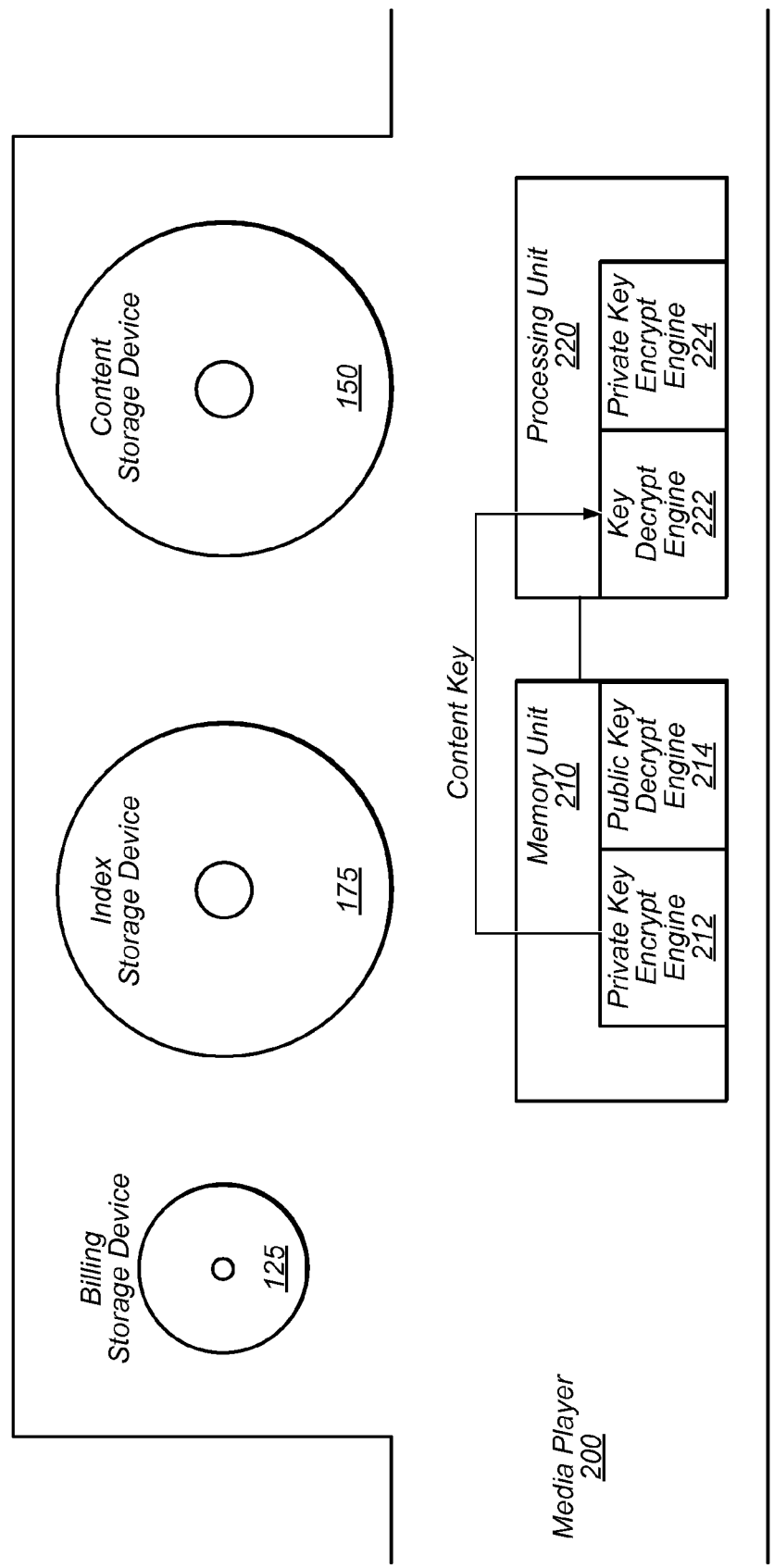
Figure 12:
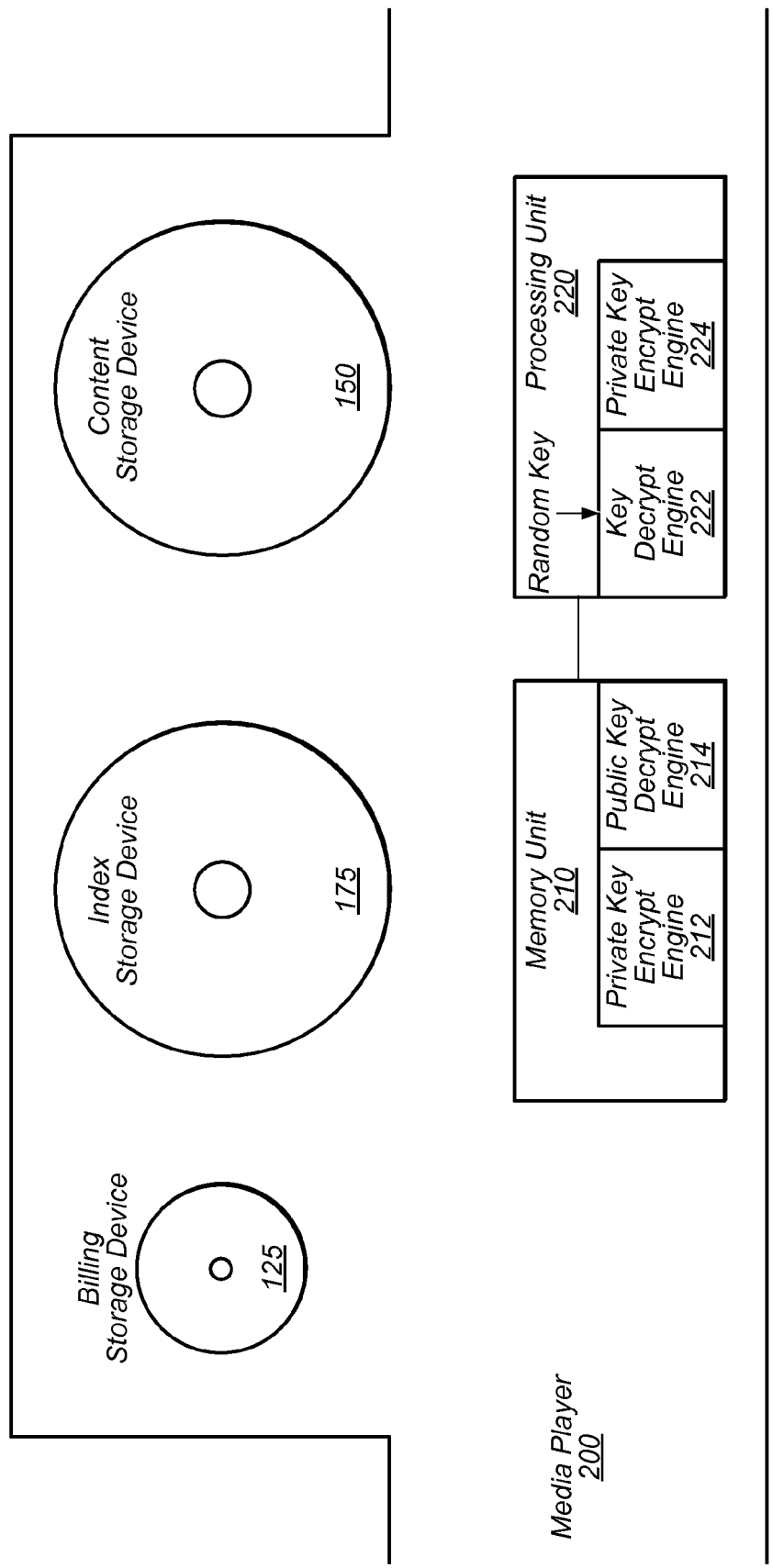

As depicted in FIG. 9, media player 200 may first access a tethered public key from the billing storage device 125. Then, processing unit 220 may create a random key (e.g., a random large bit key) and encrypt the random key with the public key obtained from the billing storage device 125, before sending it to memory unit 210 (see FIG. 10). Memory unit 210 may decrypt and utilize the random key obtained from processing unit 220 to encrypt the content key, and send the encrypted content key to processing unit 220 (see FIG. 11). Once the encrypted content key is stored in processing unit 220, processing unit 220 may utilize the random key to decrypt the received content key (see FIG. 12). It is noted, however, that in other implementations, the content key may be moved from memory unit 210 to memory unit 220 by other methods.

Figure 13:
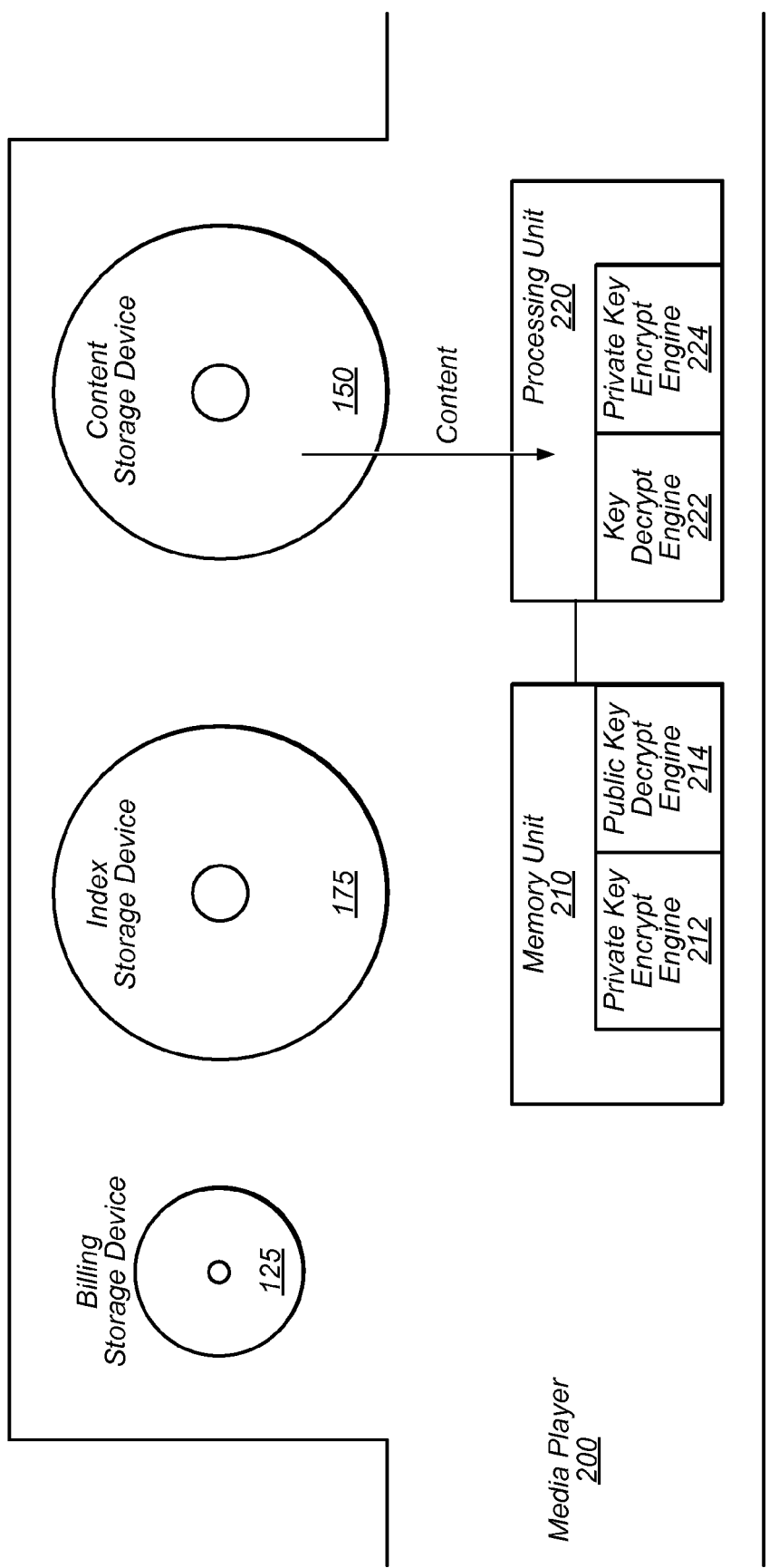
Figure 14:
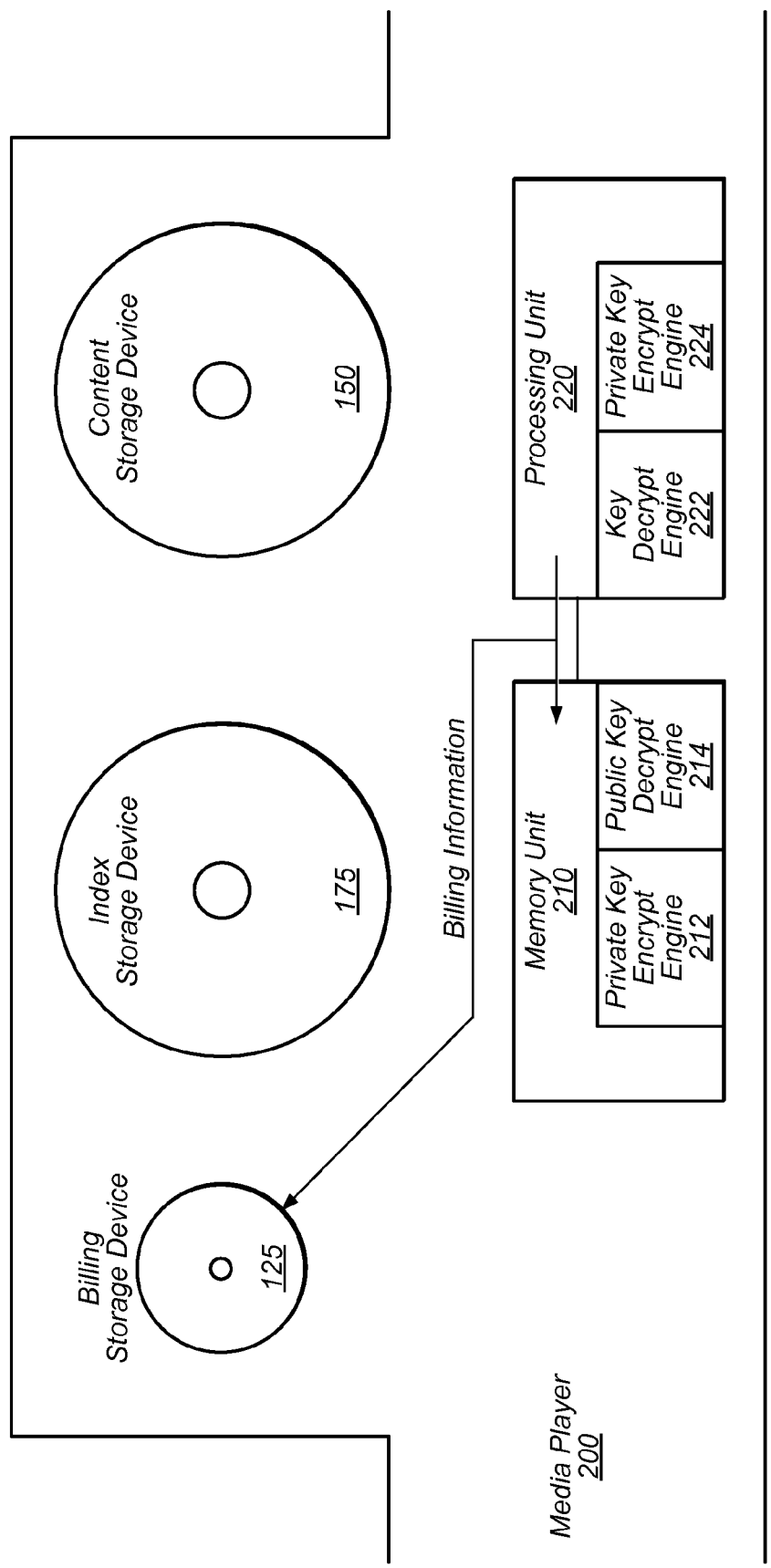
FIG. 14 is a diagram of the media player writing billing information associated with the exhibition of secure content to the customer to the billing storage device, according to one embodiment.
Figure 15:
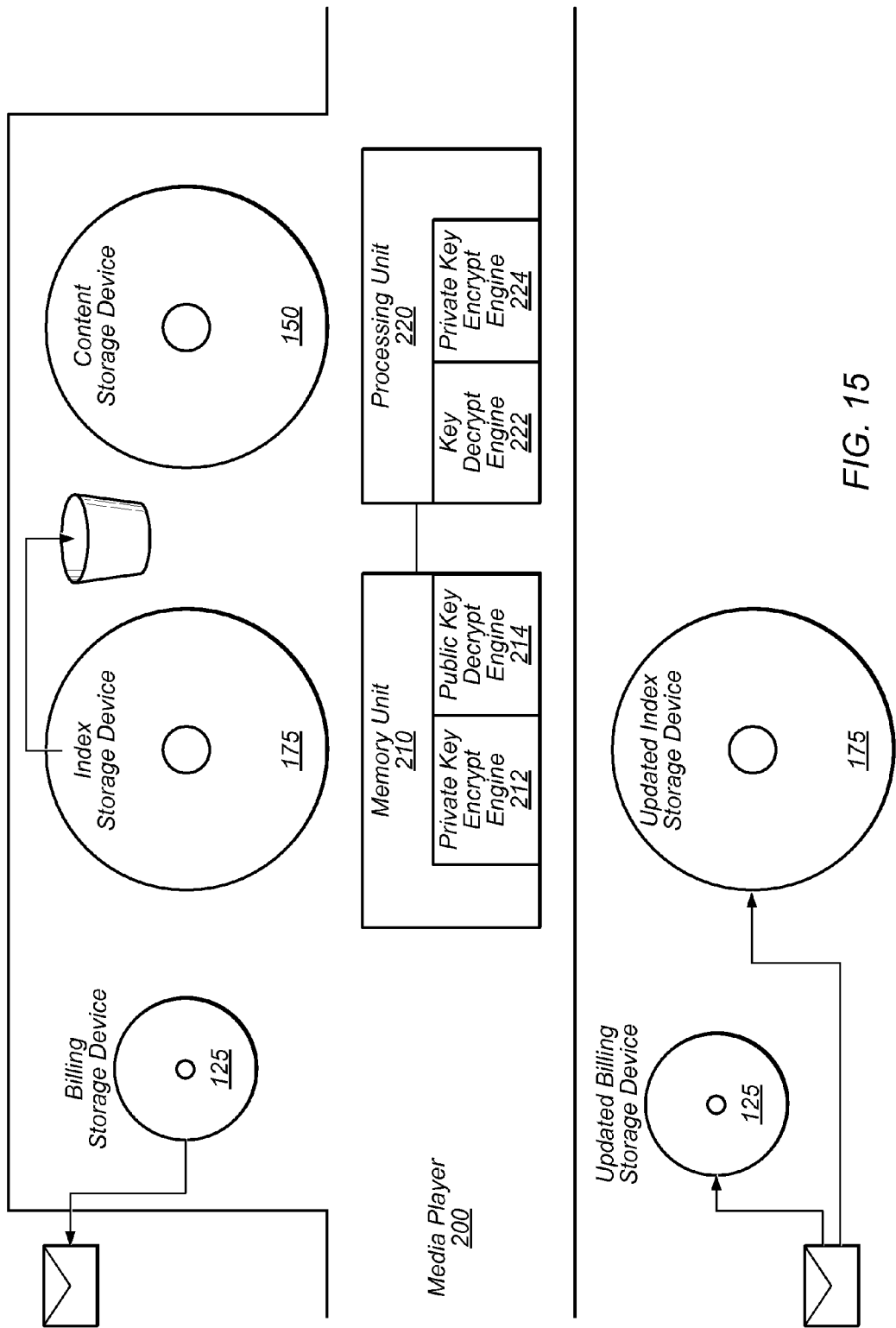
FIG. 15 is a diagram of the billing storage device being returned to the service provider via physical delivery, and updated billing and index storage devices being received by the customer via physical delivery, according to one embodiment.
Figure 16:
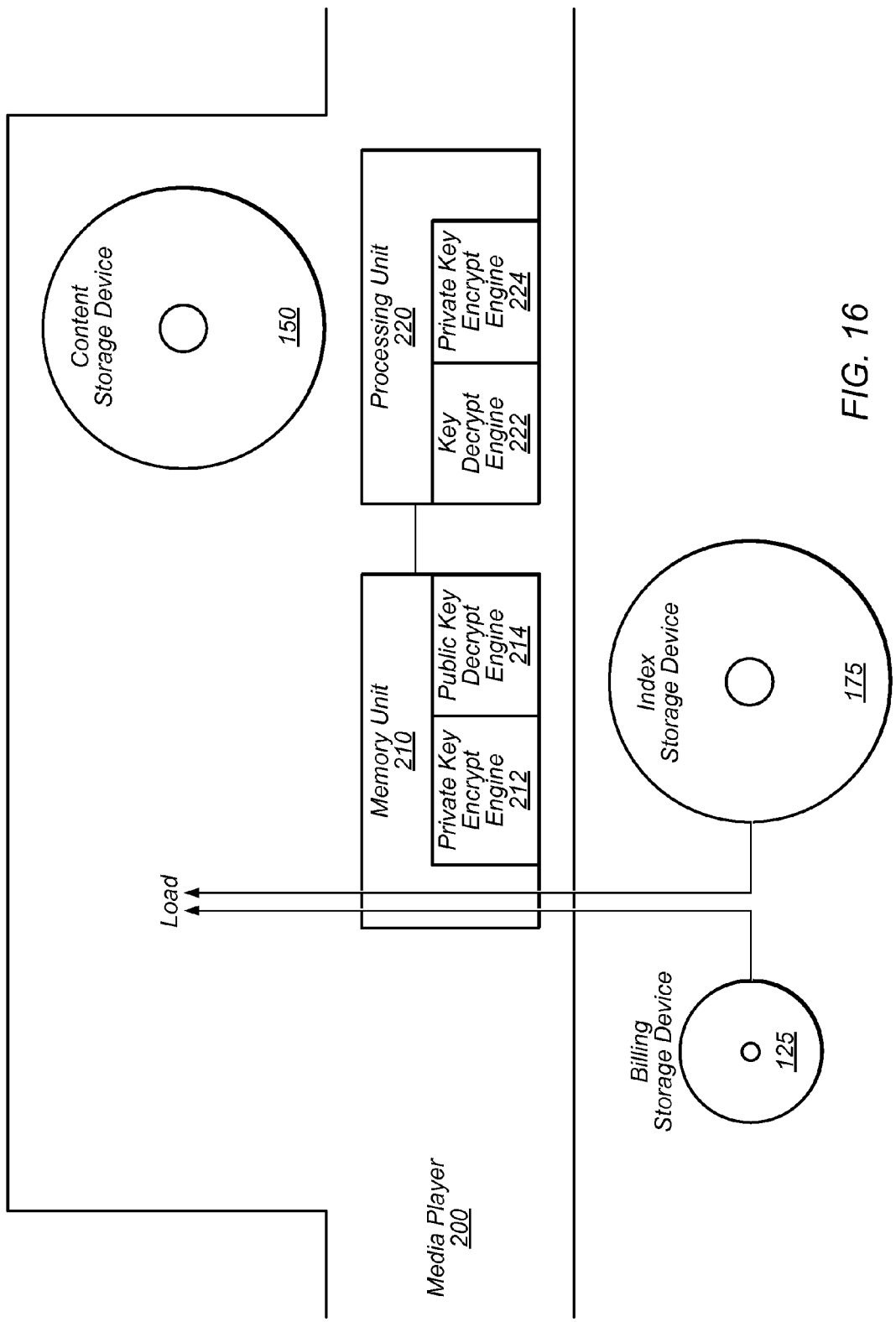
FIG. 16 illustrates a diagram of the updated billing and index storage devices being loaded into the media player, according to one embodiment.

After decrypting the content key, media player 200 may read the secure content from the content storage device 150 and decrypt the content using the content key to exhibit the content to the customer (see FIG. 13). As was previously described above, after the exhibition of the content, billing information is securely written to the billing storage device 125. In one embodiment, the billing information may also be written to memory unit 210 of media player 200 (see FIG. 14). At the end of a billing period, the billing storage device 125 is physically delivered to a local, regional, or central location, and the updated billing storage device 125 and the updated index storage device 175 are then physically delivered to the customer (see FIG. 15). The customer may then load the updated billing storage device 125 and the updated index storage device 175 into media player 200 and the process may start all over again (see FIG. 16). Based on the method and apparatus described above with reference to FIGS. 1-16, the consumer may be able to have a secure, on-demand experience with respect to accessing content, such as movies, and at the same time, not require electronic data transmission into or out of the physical location of the customer.

In various other embodiments, additional methods may be employed to accomplish a secure physical billing. For instance, in one embodiment, media player 200 may generate a paper printout of a secure billing code that contains the necessary encoded information required for billing purposes. The resulting printout may then be physically delivered to a service center. In another example, media player 200 may generate a viewable billing code on a display area of media player 200 or on the content display (e.g., a television), or media player 200 may generate an audible playback of the billing code. The billing code contains the necessary encoded information required for billing purposes. The user then simply records the code and physically delivers it to a service center.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    providing content storage devices by a content provider for delivery to a customer via a first physical delivery method, wherein the content storage devices include a plurality of content storage devices that store secure content playable by a media player;
    providing a billing storage device for delivery to the customer via a second physical delivery method, wherein the billing storage device includes one or more decryption keys, wherein the media player is configured to use the one or more decryption keys on the billing storage device to decrypt, without electronic transmissions to or from a remote server of the content provider, the secure content stored on the plurality of content storage devices and to display the decrypted secure content, wherein the billing storage device is configured to store an indication that particular decrypted secure content has been displayed by the media player; and
    receiving the billing storage device provided by the customer via a third physical delivery method, wherein the billing storage device includes secure billing information stored in a writeable area of the billing storage device, wherein the secure billing information indicates decrypted secure content displayed by the media player.

2. The method of claim 1, further comprising:
    processing the secure billing information obtained from the billing storage device and,
    billing the customer for the displaying of the secure content associated with one or more of the plurality of content storage devices.

3. The method of claim 2, wherein the secure billing information includes data indicating a number of times the secure content of at least one of the plurality of content storage devices was displayed.

4. The method of claim 3, wherein the secure billing information also includes data indicating whether any of the secure content associated with the plurality of content storage devices was purchased by the customer.

5. The method of claim 3, wherein the secure billing information also includes data indicating whether any of the secure content was selected by the customer for a rent-to-own program.

6. The method of claim 1, further comprising:
    providing an analysis of the customer at least based in part on the decrypted secure content displayed by the media player.

7. The method of claim 1, wherein the billing storage device is provided to the customer according to a predetermined billing cycle.

8. The method of claim 7, wherein the predetermined billing cycle is a monthly billing cycle.

9. The method of claim 7, further comprising:
    in one or more billing periods following an initial billing period, providing one or more additional content storage devices and an updated billing storage device for delivery to the customer, wherein the updated billing storage device includes decryption information corresponding to all previously delivered content storage devices and decryption information corresponding to the one or more additional content storage devices.

10. The method of claim 1, wherein said media player is configured to decrypt secure content of a selected content storage device using decryption information of the billing storage device, display the secure content, and write secure billing information associated with the displaying of the secure content to the writeable area of the billing storage device, in response to the customer receiving and loading the selected content storage device and the billing storage device into the media player.

11. The method of claim 1, wherein the secure content is displayed by the media player, without electronic transmission to or from a remote server of the content provider.

12. The method of claim 1, wherein the billing storage device includes a public key corresponding to a private key of the media player, and a plurality of content keys corresponding to the secured content of the plurality of content storage devices, wherein the corresponding public and private keys are usable by the media player to decrypt one or more of the plurality of the content keys corresponding to a selected secured content of a selected content storage device, and the decrypted content key is usable by the media player to decrypt the selected secure content of the selected content storage device to display the selected secure content.

13. The method of claim 1, further comprising:
    providing an index storage device for delivery to the customer via physical delivery, wherein the index storage device includes decryption keys, which along with the decryption keys of the billing storage device, are usable by the media player to decrypt the secure content of the content storage devices to display the secure content.

14. The method of claim 13, wherein the media player is configured to decrypt the secure content of the selected content storage device using decryption information of the billing storage device and of the index storage device, display the secure content, and write secure billing information associated with the displaying of the secure content to the writeable area of the billing storage device, in response to the customer receiving and loading a selected one of the content storage devices, the index storage device, and the billing storage device into the media player.

15. The method of claim 13, wherein the billing storage device includes a public key corresponding to a private key of the media player, wherein the index storage device includes a plurality of content keys corresponding to the plurality of content storage devices, wherein the corresponding public and private keys are usable by the media player to decrypt one or more of the plurality of the content keys corresponding to the selected content storage device, and wherein the decrypted content key is usable by the media player to decrypt the secure content of the selected content storage device to display the secure content.

16. The method of claim 13, wherein the index storage device further includes pricing information associated with the secure content of the content storage devices.

17. The method of claim 13, wherein the index storage device further includes content trailers corresponding to the secure content of the content storage devices.

18. The method of claim 13, wherein the index storage device further includes content descriptions corresponding to the secure content of the content storage devices.

19. The method of claim 1, wherein the billing storage device further includes personalized advertisements for the customer.

20. The method of claim 1, wherein the billing storage device further includes personalized rewards or incentives for the customer.

21. The method of claim 1, wherein the billing storage device further includes personalized time zone settings and associated unlock information for content release dates.

22. The method of claim 1, wherein at least one of said first, second, or third physical delivery methods includes delivery by mail or delivery by courier.

23. The method of claim 1, wherein the first, second, and third physical delivery methods are of a same type.

24. The method of claim 1, wherein at least one of the first, second, and third physical delivery methods is of a different type than at least one of the first, second, and third physical delivery methods.

25. A method comprising:
receiving content storage devices from a content provider via a first physical delivery method, wherein the content storage devices include a plurality of content storage devices that store secure content playable by a media player;
receiving a billing storage device via a second physical delivery method, wherein the billing storage device includes decryption keys, wherein the a media player is configured to use the one or more of the decryption keys in the billing storage to decrypt, without electronic transmissions to or from a remote server of the content provider, secure content stored on the plurality of content storage devices and to display the decrypted secure content and wherein the billing storage device is configured to store an indication that, particular decrypted secure content has been displayed; and
returning the billing storage device to a service center via a third physical delivery method, wherein the billing storage device includes secure billing information stored in a writeable area of the billing storage device, and wherein the secure billing information indicates decrypted secure content displayed by the media player.

26. The method of claim 25, further comprising providing an analysis of the customer at least in part based on the decrypted secure content displayed by the media player.

27. The method of claim 25, wherein said media player is configured to decrypt the secure content of the selected content storage device using decryption information of the billing storage device, display the secure content, and write billing information corresponding to the displaying of the secure content to a writeable area of the billing storage device, in response to loading a selected one of the content storage devices and the billing storage device into the media player.

28. The method of claim 25, wherein the secure content is displayed by the media player without electronic transmissions to or from a remote server of the content provider.

29. The method of claim 25, wherein the billing storage device includes a public key corresponding to a private key of the media player, and a plurality of content keys corresponding to secured content of the plurality of content storage devices, wherein the corresponding public and private keys are usable by the media player to decrypt one or more of the plurality of the content keys corresponding to a selected content of a selected content storage device, and the decrypted content key is usable by the media player to decrypt the selected secure content of the selected content storage device to display the selected secure content.

30. The method of claim 25, further comprising:
receiving an index storage device via physical delivery, wherein the index storage device includes decryption information, which along with decryption information of the billing storage device, is usable by the media player to decrypt the secure content of the content storage devices to display the secure content.

31. The method of claim 30, further comprising:
loading a selected one of the content storage devices, the index storage device, and the billing storage device into the media player, wherein said media player is configured to decrypt the secure content of the selected content storage device using the decryption information of the billing storage device and of the index storage device, display the secure content, and write billing information associated with the displaying of the secure content to a writeable area of the billing storage device.

32. The method of claim 30, wherein the billing storage device includes a public key corresponding to a private key of the media player, wherein the index storage device includes a plurality of content keys corresponding to the plurality of content storage devices, wherein the corresponding public and private keys are usable by the media player to decrypt one or more of the plurality of the content keys corresponding to a selected content of a selected content storage device, and the decrypted content key is usable by the media player to decrypt the selected secure content of the selected content storage device to display the selected secure content.

33. The method of claim 25, wherein at least one of said first, second, or third physical delivery methods includes delivery by mail or delivery by courier.

34. The method of claim 25, wherein said returning the billing storage device includes returning the billing storage in a later billing period according to a predetermined billing cycle.

35. The method of claim 34, wherein the predetermined billing cycle is a monthly billing cycle.

36. The method of claim 34, wherein at one or more billing periods the customer keeps the received content storage devices to build a library of content.

37. The method of claim 34, further comprising:
in a billing period following an initial billing period, receiving one or more additional content storage devices and an updated billing storage device from the service center, wherein the updated billing storage device includes decryption information corresponding to all previously received content storage devices and decryption information corresponding to the one or more additional content storage devices.

38. The method of claim 25, wherein the secure billing information includes data indicating a number of times the secure content of one or more content storage devices was displayed.

39. The method of claim 38, wherein the secure billing information also includes data indicating whether any of the secure content associated with the content storage devices was purchased by the customer.

40. The method of claim 38, wherein the secure billing information also includes data indicating whether any of the secure content was selected by the customer for a rent-to-own program.

41. The method of claim 25, wherein the first, second, and third physical delivery methods are of a same type.

42. The method of claim 25, wherein at least one of the first, second, and third physical delivery methods is of a different type than at least one of the first, second, and third physical delivery methods.

43. A method comprising:
providing content storage devices by a content provider for delivery to a customer via a first physical delivery method, wherein the content storage devices include a plurality of content storage devices that store secure content playable by a media player;
at a billing period of a predetermined billing cycle, providing a billing storage device for delivery to the customer via a second physical delivery method, wherein the billing storage device includes one or more decryption keys, wherein in response to the customer loading a selected one of the content storage devices and the billing storage device in a media player, said media player decrypting, without electronic transmissions to or from a remote server of the content provider, the secure content of the selected content storage device using the decryption keys of the billing storage device, exhibiting displaying the decrypted secure content, and writing secure billing information associated with the displaying of the decrypted secure content to a writeable area of the billing storage device; and receiving the billing storage device provided by the customer via a third physical delivery method, wherein the billing storage device includes secure billing information stored in the writeable area of the billing storage device, wherein the secure billing information indicates decrypted secure displayed by the media player.

44. The method of claim 43, wherein the first, second, and third physical delivery methods are of a same type.

45. The method of claim 43, wherein at least one of the first, second, and third physical delivery methods is of a different type than at least one of the first, second, and third physical delivery methods.

46. A method, comprising:
receiving from a content provider a content storage device in a media player, wherein the content storage device includes secure content playable by the media player;
receiving a billing storage device in the media player, wherein the billing storage device includes first decryption keys corresponding to the secure content of the content storage device;
receiving an index storage device in the media player, wherein the index storage device includes second decryption keys corresponding to the secure content of the content storage device;
obtaining the first decryption keys from the billing storage device;
obtaining the second decryption keys from the index storage device;
decrypting, without electronic transmissions to or from a remote server of the content provider, the secure content of the content storage device using the first and second decryption keys;
displaying the secure content to a user of the media player; and
writing secure billing information to a writeable area of the billing storage device, wherein the secure billing information corresponds to the displaying of the secure content by the media player.

47. The method of claim 46, further comprising:
in response to the user loading a selected one of the content storage devices, the index storage device, and the billing storage device into the media player, decrypting the secure content of the selected content storage device using the first and second decryption keys, displaying the secure content, and writing secure billing information associated with the displaying of the secure content to the writeable area of the billing storage device.

48. A media player comprising:
a storage device receiving mechanism configured to receive one or more content storage devices provided by a content provider and a billing storage device, wherein the one or more content storage devices include secure content, and the billing storage device includes decryption information associated with the secure content of the one or more content storage devices;
a processing unit configured to obtain the decryption information from the billing storage device to decrypt, without electronic transmissions to or from a remote server of the content provider, the secure content of a selected one of the one or more content storage devices received by the storage device receiving mechanism;
wherein the processing unit is further configured to cause secure billing information to be written to a writeable area of the billing storage device, and wherein the secure billing information corresponds to the decrypted secure content displayed.

49. The media player of claim 48, wherein the storage device receiving mechanism is further configured to receive an index storage device, wherein the index storage device includes decryption information, which along with the decryption information of the billing storage device, is useable by the media player for decrypting the secure content of the content storage devices to display the secure content.

50. The media player of claim 49, wherein, in response to the user loading a selected one of the content storage devices, the index storage device, and the billing storage device into the media player, the processing unit is configured to decrypt the secure content of the selected content storage device using the decryption information of the billing storage device and of the index storage device, display the secure content, and write secure billing information corresponding to the displaying of the secure content to the writeable area of the billing storage device.

51. A media player configured to receive a content storage device including secure content provided by a content provider, and a billing storage device including decryption information associated with the secure content of the content storage device, the media player comprising:
a processing unit; and
a memory unit coupled to the processing unit, wherein the memory unit comprises program instructions, which are executable by the processing unit to:
obtain the decryption information from the received billing storage device;
decrypt, without electronic transmission to or from a remote server of the content provider, the secure content of the received content storage device using the decryption information;
display the decrypted secure content;
store in the received billing storage device an indication that particular decrypted secure content has been displayed; and
write secure billing information to a writeable area of the received billing storage device, wherein the secure billing information is associated with the displaying of the decrypted secure content.

* * * * *